(12) United States Patent
Hosokawa

(10) Patent No.: US 7,046,475 B2
(45) Date of Patent: May 16, 2006

(54) APPARATUS AND METHOD FOR CONTROLLING HEAD UNLOAD OPERATION IN DISK DRIVE

(75) Inventor: Koji Hosokawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/004,094

(22) Filed: Dec. 6, 2004

(65) Prior Publication Data

US 2005/0128633 A1    Jun. 16, 2005

(30) Foreign Application Priority Data

Dec. 15, 2003    (JP)    .............................. 2003-416143

(51) Int. Cl.
*G11B 21/02*    (2006.01)
(52) U.S. Cl. ...................................................... 360/75
(58) Field of Classification Search ..................... None
See application file for complete search history.

(56) References Cited

U.S. PATENT DOCUMENTS 6,108,157 A * 8/2000 Yoneda et al. ................ 360/75
6,396,652 B1 * 5/2002 Kawachi et al. .............. 360/75
6,639,750 B1 * 10/2003 Hirano et al. ................. 360/75
6,765,742 B1 * 7/2004 Kusumoto .................... 360/75
6,765,746 B1 * 7/2004 Kusumoto .................... 360/75

FOREIGN PATENT DOCUMENTS

JP    2001-307451    11/2001

* cited by examiner

*Primary Examiner*—K. Wong
(74) *Attorney, Agent, or Firm*—Pillsbury Winthrop Shaw Pittman LLP

(57) ABSTRACT

A seek control device, such as a CPU, moves a head to a particular track on a recording surface of a disk before a head unload operation. A speed feedback control device, such as the CPU, detects the movement speed of the head at predetermined sampling intervals and then performs speed feedback control on the basis of the detected speed. The speed feedback control is performed a predetermined number of times. By integrating the speed detected at the sampling intervals, an estimation device, such as the CPU, estimates the distance that the head has moved while the speed feedback control is performed the predetermined number of times. A head unload operation determining device, which may also be the CPU, determines whether the head unload operation has been correctly completed on the basis of the estimated head movement distance.

12 Claims, 9 Drawing Sheets

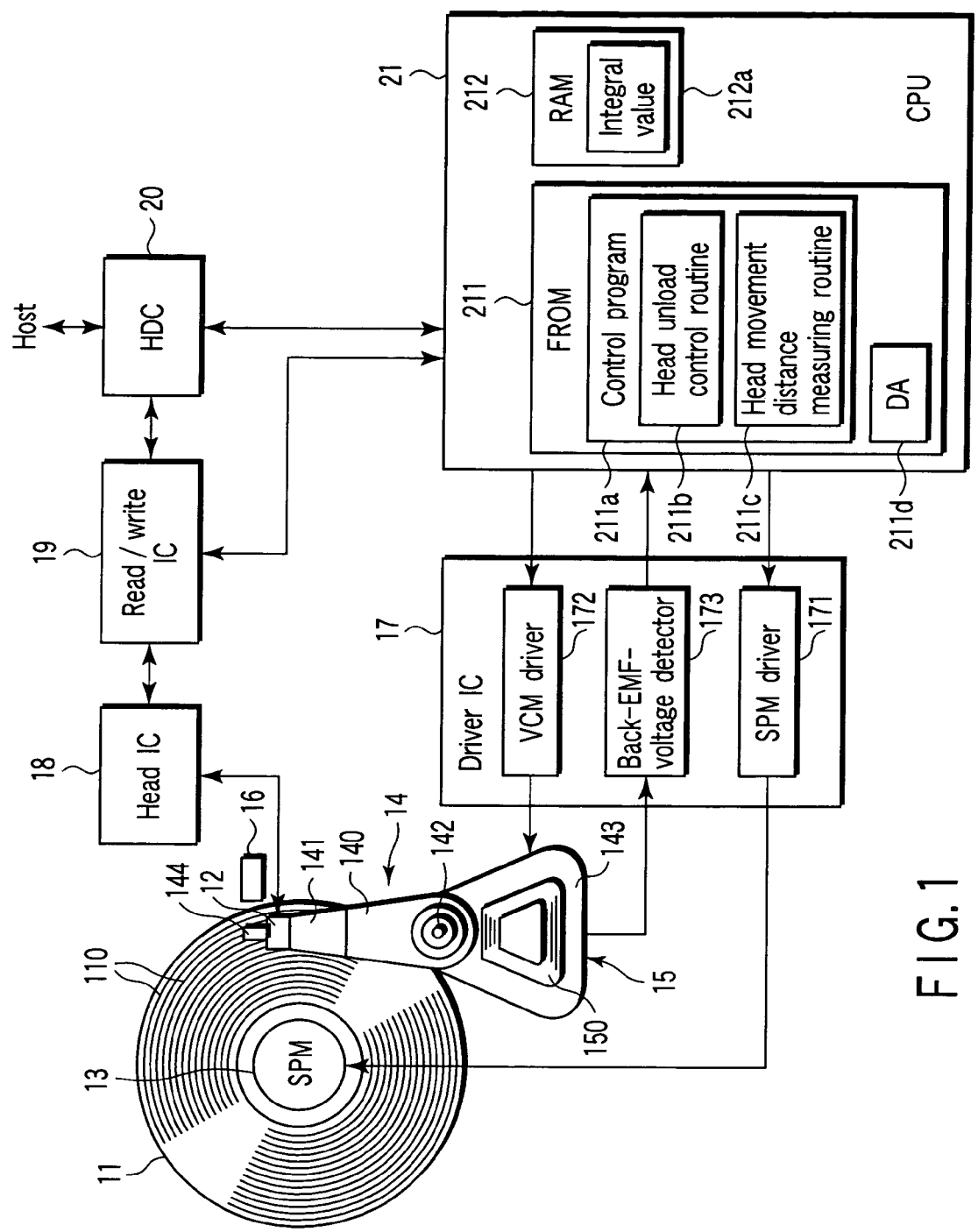
F I G. 1

APPARATUS AND METHOD FOR CONTROLLING HEAD UNLOAD OPERATION IN DISK DRIVE

CROSS-REFERENCE TO RELATED APPLICATIONS

This application is based upon and claims the benefit of priority from prior Japanese Patent Application No. 2003-416143, filed Dec. 15, 2003, the entire contents of which are incorporated herein by reference.

BACKGROUND OF THE INVENTION

1. Field of the Invention

The present invention relates to a disk drive having a head that reads data written on a recording surface of a disk. In particular, the present invention relates to an apparatus and method for controlling a head unload operation in a disk drive, the apparatus and method being suitable for detecting an error in unloading of the head in a particular retract area located away from the recording surface of the disk.

2. Description of the Related Art

Recent disk drives, for example, hard disk drives, commonly comprise a ramp. The ramp provides a retract area to which the head is retracted (parked). The retract area partly serves as a stopper that locks the head in the retract area, the head being retracted to the retract area. The position of the stopper constitutes a terminal position of the retract area. The ramp is located away from a recording surface of the disk. The head is supported by a suspension. The suspension is formed at a tip of an actuator. The actuator moves in a radially across the disk. The actuator includes a voice coil motor (VCM) that drives the actuator. A tab is formed at a tip of the suspension. Actually, the tab is retracted to the retract area of the ramp, where it is locked by the stopper. However, for simplification, a common description is that the head is retracted to the ramp or the head is locked by the stopper.

The operation of retracting the head to the retract area of the ramp is called an "unload" (head unload). In contrast, the operation of moving the head to the recording surface of the disk is called a "load" (head load). A large number of concentric tracks are formed on the recording surface of the disk. Further, servo information is prewritten (embedded) in each track discretely at regular intervals. The servo information contains position information (a cylinder code) indicating the position of a cylinder (track) on the disk in which the servo information is written.

During a load/unload operation of the head, the head may not be present on the recording surface of the disk. In this state, the head cannot read the servo information written on the disk. In this case, the hard disk drive cannot detect the position of the head on the basis of the position information contained in the servo information. Consequently, the hard disk drive cannot detect the movement speed (head speed) of the head either. However, a back electromotive force voltage (back-EMF-voltage) generated in the voice coil motor when the head is moved represents the speed of the head (the speed of the actuator). Jpn. Pat. Appln. KOKAI Publication No. 2001-307451 discloses a technique to perform a load/unload operation by speed control (this technique will hereinafter referred to as the "conventional technique"). With this conventional technique, for example, in a head unload operation, the head speed is calculated from the back-EMF-voltage of the voice coil motor. Then, feedback control is performed so as to make the head speed detected appropriate. The distance that the head has moved is also detected (calculated) on the basis of the head speed. In a head unload operation, the head must reliably reach the stopper position. Thus, whether or not the head has reached the stopper position (the terminal position of the retract area) is determined on the basis of the head movement distance detected.

However, if the speed is not correctly detected and the speed detected is thus different from the actual one, then the head movement distance is also different from the actual one. In this case, it is impossible to correctly determine whether or not the head has reached the terminal position of the retract area of the ramp. Then, it may be erroneously determined that the head has reached the terminal position of the retract area even through the head has not actually reached the terminal position. If the head unload operation is completed in accordance with this erroneous determination and if for example, the hard disk drive is subsequently externally impacted or vibrated, then the head may fall onto the recording surface of the disk. In general, the head unload operation is performed to shift the head disk drive (disk drive) to an inoperative state. Then, if a host does not provide any commands for a specified time after the head unload operation has been completed, rotation of the disk is often stopped. If the head is present on the recording surface of the disk while the rotation of the disk remains stopped, the head sticks to the disk.

BRIEF SUMMARY OF THE INVENTION

In accordance with an embodiment of the invention, there is provided a disk drive having a head which reads data written on a recording surface of a disk. The disk drive comprises an actuator, a ramp, a speed detector, a seek control device, a speed feedback control device, an estimation device, and a head unload operation determining device. The actuator supports the head such that the head is movable in a radial direction of the disk. The ramp is located away from the recording surface of the disk. The ramp has a retract area to which the head is retracted. The speed detector detects a movement speed of the head at predetermined sampling intervals. The seek control device moves the head to a particular radial position on the recording surface of the disk before a head unload operation of retracting the head to the retract area of the ramp. The speed feedback control device performs speed feedback control for the head unload operation on the basis of the movement speed of the head detected by the speed detector. The speed feedback control is performed to make the movement speed of the head equal to a target value. The speed feedback control is performed a prespecified number of times required to retract the head to the retract area of the ramp. The estimation device estimates a movement distance of the head. The estimation device calculates the estimated movement distance of the head by integrating the speed detected by the speed detector. The head unload operation determining device determines whether the head unload operation has been correctly completed on the basis of the movement distance of the head estimated by the estimation device after the speed feedback control has been performed the pre-specified number of times.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a hard disk drive according to an embodiment of the present invention;

DETAILED DESCRIPTION OF THE INVENTION

Figure 2:
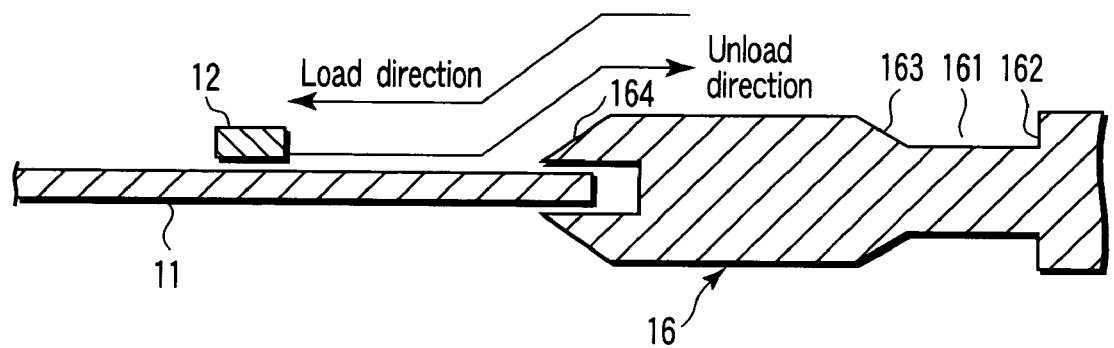
FIG. 2 is a sectional view of a ramp 16 shown in FIG. 1, the view being taken along a radial direction of a disk 11.

With reference to the drawings, description will be given of an embodiment in which the present invention is applied to a hard disk drive.

FIG. 1 is a block diagram showing the configuration of a hard disk drive (HDD) according to an embodiment of the present invention. In FIG. 1, a disk (magnetic disk) 11 has two disk surfaces: a top disk surface and a bottom disk surface. At least one of the two disk surfaces of the disk 11 serves as a recording surface on which data is magnetically recorded. A head (magnetic head) is placed in association with the recording surface of the disk 12. The head 12 is used to read and write data from and to the disk 11. It is assumed in the configuration shown in FIG. 1 that the hard disk drive includes a single disk 11. However, the drive may have a plurality of disks 11 that are stacked one above another.

A large number of concentric tracks 110 are formed on the recording surface of the disk 11. Further, servo information is pre-written (preembedded) in each of the tracks 110 discretely at regular intervals. The servo information contains position information required to position the head 12 on a target track. The position information contains a cylinder code indicating a cylinder (track) on the disk 11 in which the servo information is written.

The disk 11 is rotated at high speed by a spindle motor (SPM) 13. The head 12 is attached to an actuator (carriage) 14. More specifically, the head 12 is attached to a suspension 141 extending from an arm 140 of the actuator 14. The head 12 moves in the direction of the radius of the disk 11 in accordance with the rotation of the actuator 14. Thus, the head 12 is positioned on the target track. The actuator 14 includes a voice coil motor (VCM) 15 serving as a driving source of the actuator 14. The actuator 14 is driven by the VCM 15.

A through-hole is formed in an almost central portion of the actuator 14. A pivot 142 is fitted into the through-hole in the actuator 14. The actuator 14 is supported rotatably around the pivot 142. This allows the head 12 to move in the radial direction of the disk 11 while rotatively moving integrally with the arm 140 and suspension 141. The actuator 14 has a support frame 143 extending in a direction opposite to that in which the arm 141 extends. A voice coil 150 is integrally embedded in the support frame 143. The voice coil 150 is located between a top yoke and a bottom yoke. The voice coil 150, together with both yokes and a permanent magnet fixed to the bottom yoke, constitutes the VCM 15.

The disk 11 has an inner periphery and an outer periphery. A ramp 16 is placed away from the recording surface of the disk 11, for example, in proximity to the outer periphery of the disk 11. The ramp 16 may be located in proximity to the inner periphery of the ramp 16. The ramp 16 is used to retract the head to an area located away from the recording surface of the disk 11 and to maintain the head in this area while the HDD is in a power save mode. However, actually, a tab 144 is located on the ramp 16 instead of the head 12. Thus, the ramp 16 is placed at a predetermined position on a movement path of the tab 144. Here, the expression "the head 12 is unloaded on the ramp 16" may be used in order to avoid complicated expressions. In contrast, while the HDD is in a read/write mode, the head 12 is present on the disk 11. The read/write mode is a non-power-save mode in which data can be immediately read from or written to the disk 11. Depending on the type of HDD, a plurality of power save modes may be defined in accordance with the level of power consumption saving. The plurality of power save modes may include one in which the head 12 is present on the disk 11. Thus, in the present embodiment, the power save mode in which the head 12 is retracted to the ramp 16 is called a particular inoperative mode.

FIG. 2 is a sectional view of the ramp 16 taken along the radial direction of the disk 11. A concave parking portion 161 is formed in a part of the ramp 16 which is farther from the disk 11. The parking portion 161 serves as a retract area in which the tab 144 is parked (retracted). A sidewall of the parking portion 161 which is farther from the disk 11 serves as a stopper 162 that stops (locks) the tab 144 during a head unload operation. A sidewall of the parking portion 161 which is closer to the disk 11 serves as an inclined surface 163 that allows the tab 144 to smoothly escape from the parking portion 161 during a head load operation. A surface of the ramp 161 which is closer to the disk 11 serves as an inclined surface 164 that guides the tab 144 from the disk 11 to the ramp 16 during head unload.

The HDD shown in FIG. 1 has a latch mechanism (not shown). The latch mechanism is used to latch the actuator 14 using for example, a magnetic attraction force when the head 12 (tab 144) reaches the parking portion 161 of the ramp 16 during a head unload operation. The latch mechanism is composed of a magnet supported by a case of the HDD and a magnetic member consisting of for example, metal and fixed to an end of the support frame 143 of the actuator 14 which is closest to the disk 11.

The SPM 13 and VCM 15 are driven by respective drive currents (an SPM current and a VCM current) supplied by a driver IC 17. The driver IC 17 includes an SPM driver 171, a VCM driver 172, and a back-EMF-voltage detector 173. The SPM driver 171 supplies the SPM 13 with an SPM current corresponding to the amount of control provided by a CPU 21 described later. The VCM driver 172 supplies the VCM 15 with a VCM current corresponding to the amount of control provided by the CPU 21. The back-EMF-voltage detector 173 detects a back-EMF-voltage (back-EMF) generated by the VCM 15.

The head 12 is connected to a head IC (head amplifier circuit) 18. The head IC 18 includes a read amplifier for amplifying a read signal read by the head 12, and a write amplifier for converting write data into a write current. The head IC 18 is connected to a read/write IC (read/write channel) 19. The read/write IC 19 is a signal processing device for performing various kinds of signal processing such as analog-to-digital conversion of a read signal, encoding of write data, decoding of read data, etc.

The read/write IC 19 is connected to a disk controller (HDC) 20 and the CPU 21. The HDC 20 is connected to a host (host system) and the CPU 21. The host is a digital apparatus such as a personal computer which utilizes the HDD shown in FIG. 1. The HDC 20 has an interface control function to control reception of commands (read/write commands and the like) transferred by the host and to control data transfers between the host and the HDC 20. The HDC 20 also has a disk control function to control data transfers between the disk 11 and the HDC 20.

The CPU 21 is a main controller of the HDD shown in FIG. 1. The CPU 21 includes a flash read-only memory (FROM) 211 and a random access memory (RAM) 212. The FROM 211 is a rewritable nonvolatile memory in which a control program 211a executed by the CPU 21 is pre-stored. The control program 211a contains a head unload control routine 211b and a head movement distance measuring routine 211c. The head unload control routine 211b is a process routine for controlling a head unload operation of unloading the head 12 located on the recording surface of the disk 11 to the ramp 16. The head movement distance measuring routine 211c is a process routine for measuring the movement distance of the head during a head unload operation. A storage area of the FROM 211 is partly used as a head movement distance saving area 211d to which a reference head movement distance DA measured in accordance with the head movement distance measuring routine 211c is saved. A storage area of the RAM 212 is partly used as a work area for the CPU 21. Further, the storage area of the RAM 212 includes an integral value register 212a that holds a temporal integral value for the movement speed (head speed) of the head 12.

Figure 3:
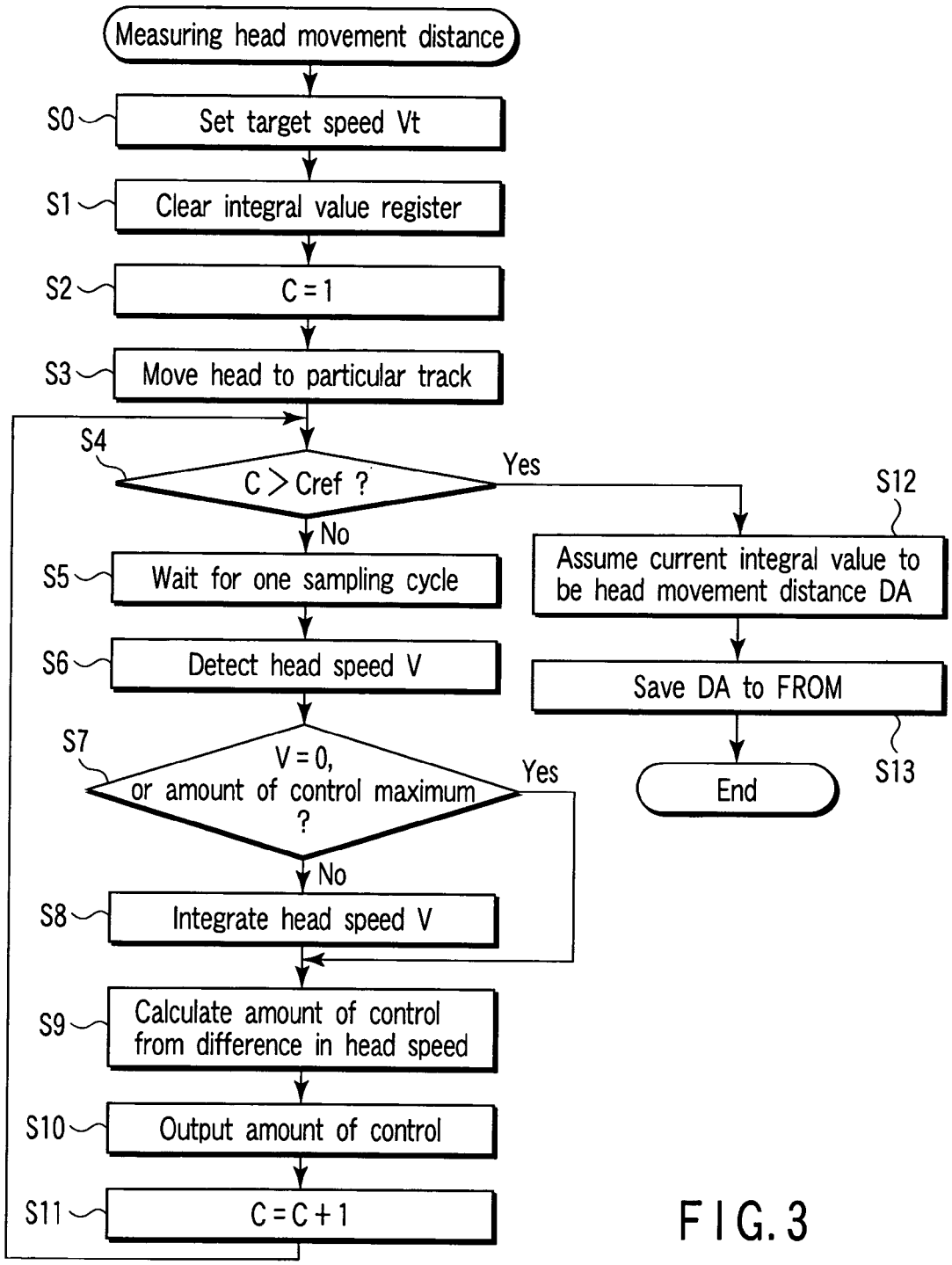
FIG. 3 is a flowchart showing the procedure of a process of measuring a head movement distance DA, the process being applied according to this embodiment.

Now, operations performed by the HDD shown in FIG. 1 will be sequentially described taking the measurement of the head movement distance and the head unload control (normal head unload control) by way of example. First, with reference to the flowchart in FIG. 3, description will be given of a process of measuring the head movement distance DA. This process is executed in accordance with the head movement distance measuring routine 211c of the control program 211a during an inspection step executed during manufacture of the HDD, the control program 211a being stored in the FROM 211. The head movement distance DA measured during this process is used as a reference for the head movement distance (reference movement distance) when the head 12 is unloaded from a particular track on the disk 11 to the parking portion 161 of the ramp 16.

First, the CPU 21 sets a target speed for the head 12 (actuator 14) (step S0). The process of measuring the head movement distance must ensure that the tab 144 (head 12) reaches the stopper 162 of the ramp 16. Thus, the target speed Vt is set at a value Vt1 larger than a normal one Vt0 so as to prevent the head 12 from stopping on the inclined surface 164. Further, the CPU 21 clears the integral value register 212a in the RAM 212 to "0" (step S1).

Then, the CPU 21 sets a counter C at an initial value of "1" (step S2). The counter C is used to manage the time (the number of sampling times) required for head unload control when the head 12 is unloaded on the ramp 16 in order to measure the head movement distance. Then, the CPU 21 controls a seek operation of moving the head 12 to the particular track on the disk 11, that is, performs what is called seek control (step S4). The seek control is performed on the basis of position information contained in servo information read from the disk 11 by the head 12. Here, the particular track is a predetermined track in the vicinity of the ramp 16, that is, a track located at a predetermined radial position on the outer peripheral side of the disk 11. The particular track is the same as a target track for seek control performed at the beginning of head unload control (normal head unload control) described later.

Thus, in the present embodiment, at the beginning of the head unload control performed during the process of measuring the head movement distance, processing in step S3 moves the head 12 to the particular track on the disk 11. Thus, the movement distance of the head 12 during a head unload operation is fixed. Here, it is assumed that feedback control (speed feedback control) is performed at regular sampling intervals to unload the head 12 from the particular track to the parking portion 161 of the ramp 16 at the target speed Vt. In this case, the head 12 is expected to reach the stopper 162 of the ramp 16 after feedback control for a predetermined number of sampling times $C0 \pm \Delta C$ ($\Delta C$ is a difference). Thus, in the present embodiment, in view of the difference $\Delta C$, the number of sampling times $C0 \pm \Delta C$ is used as a specified number of times Cref required to move the head 12 from the particular track to the stopper 162 of the ramp 16.

Then, the CPU 21 determines whether or not a value in the counter C (that is, the number of sampling times C) exceeds the specified number of times Cref ($=C0 \pm \Delta C$) (step S4). Step S4 is executed to determine whether the head unload control is to be completed or continued (performed). If the number of sampling times C is at most the specified value Cref, the CPU 21 waits for one sampling cycle (step S5) in order to continue (perform) the head unload control (speed feedback control for the head unload control). Then, the CPU 21 detects the movement speed (head speed) V of the head 12 (actuator 14) (step S6). The head speed V is detected by converting the back-EMF-voltage of the VCM 15 detected by the back-EMF-voltage detector 173 into the speed of the head 12.

The CPU 21 determines whether the head speed V detected is zero, or the amount of control for designating the VCM current has the maximum value, or neither of these conditions is met (step S7). If the head speed V detected is not zero and the amount of control does not have the maximum value, the CPU 21 calculates the temporal integral value for the head speed between the start of the head unload control and the current sampling time (step S8). In step S8, the temporal integral value for the head speed currently detected is added to the temporal integral value for the head speed integrated until the last sampling time to calculate the temporal integral value for the head speed integrated between the start of the head unload control and the current sampling time. The temporal integral value for the head speed is stored in the integral value register 212a, provided in the RAM 212. At the first sampling time, an initial value of zero is used as the temporal integral value for the head speed integrated until the last sampling time. Thus, on starting a process of measuring the head movement distance, the CPU 21 clears the integral value register 212a to "0" in step S1.

After executing step S8, the CPU 21 proceeds to step S9. In contrast, if the head speed V detected is zero or the amount of control has the maximum value, the CPU 21 determines that the head 12 has reached the stopper 162 of the ramp 16 (step S7). In this case, the CPU 21 skips step S8 to proceed to step S9. Description will be given of the effect of skipping of step S8 based on the result of the determination in step S7. First, depending on the detection accuracy of the back-EMF-voltage detector 173, the head speed V detected may not be zero even though the head 12 has reached the stopper 162 of the ramp 16. In this case, when step S8 is executed to integrate the head speed V, an erroneous head movement distance is measured. On the other hand, once the head 12 reaches the stopper 162 of the ramp 16 and stops, the amount of control is increased to the maximum value so as to maintain the head speed V at the target value. Thus, in the present embodiment, even though the head speed V is not zero, if the amount of control has the maximum value, the head 12 is considered to have reached the stopper 162 of the ramp 16. In this case, it is possible to measure an erroneous head movement distance by skipping step S8.

In step S9, the CPU 21 calculates (determines) the amount of control provided to the VCM driver 172 on the basis of the difference between the head speed V and the target value Vt (=Vt1) (step S9). The amount of control has a value required to make the head speed V equal to the target value Vt by well-known proportional integral (PI) control. The CPU 21 provides the VCM driver 172 with the amount of control calculated. The CPU 21 thus causes the VCM driver 172 to output a VCM current corresponding to the amount of control, to the VCM 15 (step S10).

After providing the VCM driver 172 with the amount of control calculated in step S9, the CPU 21 increments the counter C by one (step S1). The CPU 21 then returns to the processing in step S4. In step S4, the CPU 21 determines whether or not the value in the counter C (that is, the number of sampling times C) exceeds the specified number of times Cref. If the number of sampling times C is at most the specified value Cref, the CPU 21 proceeds to the processing in step S5 as with the above process. In contrast, if the number of sampling times C exceeds the specified value Cref as a result of repetition of the processing between the steps S5 and S11, the CPU 21 determines that the head 12 should have reached the stopper 162 of the ramp 16. In this case, the CPU 21 completes the head unload control to proceed to processing in step S12.

In step S12, the CPU 21 determines the temporal integral value for the head speed stored in the integral value register 212a of the RAM 212 to be the head movement distance (reference head movement distance) DA. The head movement distance DA determined represents the distance from the particular track to the stopper 162 of the ramp 16. The CPU 21 saves information on the head movement distance determined to the head movement distance saving area 211d of FROM 211 (step S13).

Figure 4:
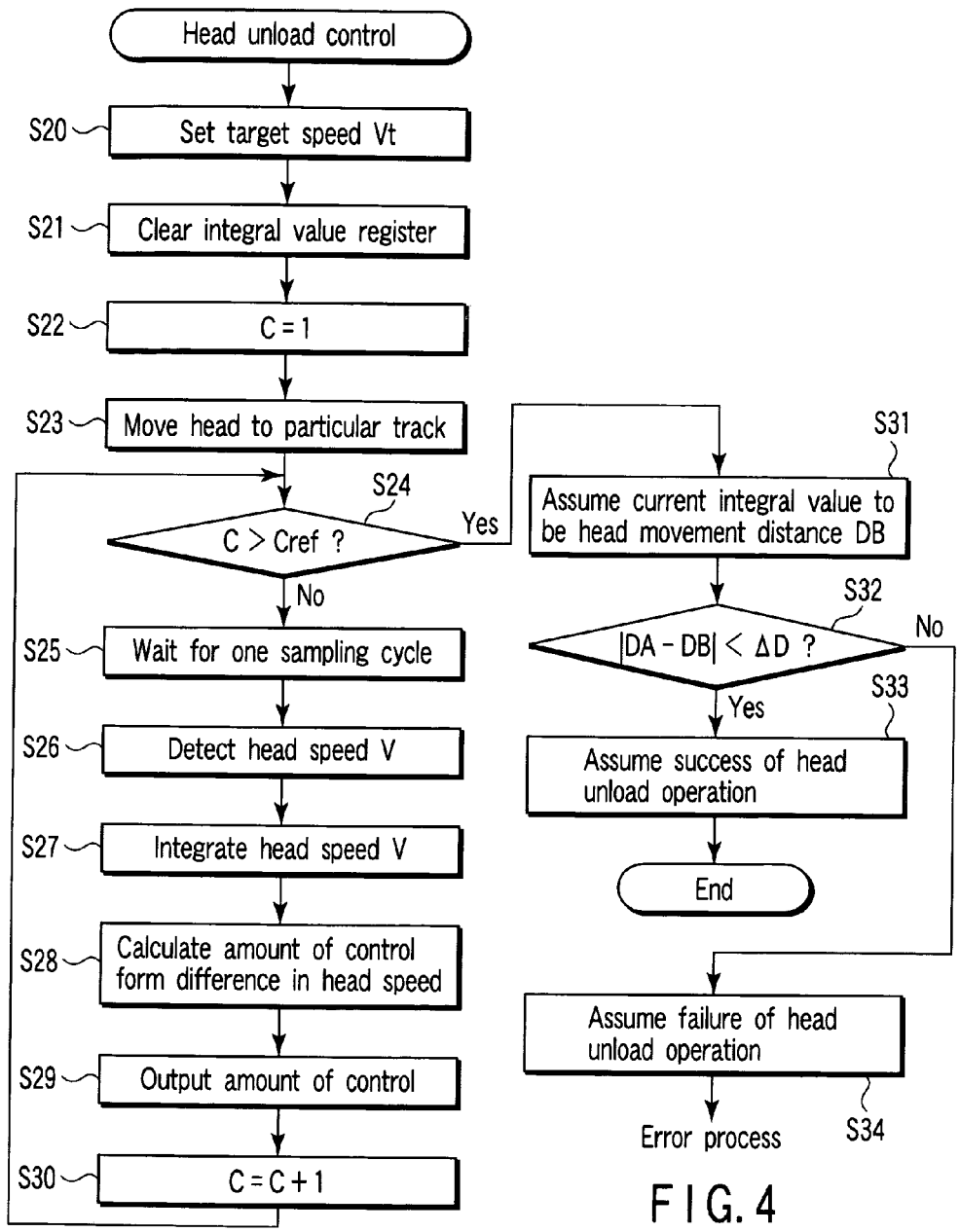
FIG. 4 is a flowchart showing the procedure of head unload control applied according to this embodiment.

Now, the normal head unload control will be described with reference to the flowchart in FIG. 4. The normal head unload control is performed to unload the head 12 on the ramp 16 when the HDD shown in FIG. 1 is set in a particular inoperative mode. The head unload control is performed by the CPU 21 as described below in accordance with the head unload control routine 211b of the control program 211a, stored in the control FROM 211.

First, the CPU 21 sets the target speed Vt for the head 12 (actuator 14) (step S20). The normal head unload control is frequently performed unlike head unload control performed during a process of measuring the head movement distance. Accordingly, every time the head unload control is to be performed, the target speed Vt is preferably set at a smaller value Vt0 (Vt0<Vt1) in order to prevent the head 12 from colliding against the stopper 162 of the ramp 16 at high speed. Then, as in the case of the process of measuring the head movement distance, the CPU 21 clears the integral value register 212a in the RAM 212 to "0" (step S21). The CPU 21 also sets the counter C at an initial value of "1" (step S22). Then, the CPU 21 performs seek control to move the head 12 to the particular track on the disk 11 (step S23).

Then, the CPU 21 determines whether or not the value in the counter C (the number of sampling times C) exceeds the specified value Cref (step S24). Step S24 is executed to determine whether the head unload control is to be completed or continued (performed). If the number of sampling times C is at most the specified value Cref as in the case of this example, the CPU 21 waits for pre-specified one sampling cycle (step S25) in order to continue (perform) the head unload control. Then, the CPU 21 detects the head speed V on the basis of the back-EMF-voltage of the VCM 15 detected by the back-EMF-voltage detector 173 (step S26).

The CPU integrates the head speed V detected to calculate the temporal integral value for the head speed between the start of the head unload control and the current sampling time (step S27). This temporal integral value for the head speed is stored in the integral value register 212a in the RAM 212. Then, the CPU 21 calculates (determines) the amount of control provided to the VCM driver 172 on the basis of the difference between the head speed V and the target value Vt (=Vt0) (step S28). The CPU 21 provides the VCM driver 172 with the amount of control calculated. The CPU 21 thus causes the VCM driver 172 to output a VCM current corresponding to the amount of control, to the VCM 15 (step S29).

After providing the VCM driver 172 with the amount of control calculated in step S28, the CPU 21 increments the counter C by one (step S30). The CPU 21 then returns to the processing in step S24. In step S24, the CPU 21 determines whether or not the value in the counter C (that is, the number of sampling times C) exceeds the specified number of times Cref. If the number of sampling times C is at most the specified value Cref, the CPU 21 proceeds to the processing in step S25 as with the above process. In contrast, if the number of sampling times C exceeds the specified value Cref as a result of repetition of the processing between the steps S25 and S30, the CPU 21 determines that the head 12 should have reached the stopper 162 of the ramp 16. In this case, the CPU 21 completes the head unload control to proceed to processing in step S31.

In step S31, the CPU 21 determines the temporal integral value for the head speed stored in the integral value register 212a of the RAM 212 to be the current head movement distance DB. The CPU 21 calculates |DA−DB| on the basis of the current head movement distance DB and the reference head movement distance DA, indicated by the information saved to the head movement distance saving area 211d of the FROM 211. The value |DA−DB| represents the absolute value of the difference between the head movement distance DA and the head movement distance DB. The CPU 21 then determines whether or not the value |DA−DB| is smaller than the preset difference ΔD (step S32). In other words, the CPU 21 determines whether or not the current head movement distance DB is equal to the reference head movement distance DA to within the value ΔD. Here, the head movement distance DB, i.e., the temporal integral value for the head speed, represents the movement distance of the head 12 estimated during the current head unload control. Accordingly, |DA−DB|<ΔD should be established if head unload control is performed a number of times equal to the number of sampling times C required to reliably unload the head 12 in the parking portion 161 of the ramp 16 and if the head 12 (tab 144) has correctly reached the stopper 162 of the parking portion 161. The relationship |DA−DB|<ΔD, like C<Cref, is a kind of condition for determining that head unload is completed.

Thus, if the value |DA−DB| is smaller than the difference ΔD (step S32), the CPU 21 determines that the head unload operation has succeeded, that is, the head 12 has been reliably unloaded in the parking portion 161 of the ramp 16 (step S33). In contrast, if the value |DA−DB| is at least the difference ΔD (step S32), the CPU 21 determines that the head unload operation is likely to have failed, that is, the head 12 is unlikely to have unloaded in the parking portion 161 of the ramp 16 (step S34). This failure occurs when for example, the head 12 (tab 144) is stopped on the inclined surface 164 of the ramp 16. The failure also occurs when the head speed cannot be correctly detected owing to a defect in the back-EMF-voltage detector 173 and when the temporal integral value for the head speed thus does not represent the correct head movement distance DB. In this case, even if the head unload control is performed a number of times equal to the number of sampling times C required to reliably unload the head 12 in the parking portion 161 of the ramp 16, the value |DA−DB| may be at least the difference ΔD. If the head unload operation fails, the CPU 21 executes an error process, for example, retries a head unload operation.

The head unload control may be continued until the relationship |DA−DB|<ΔD is established. In this case, the head unload operation can be determined to be successful if the number of sampling times C is within the range of C0±ΔC when the relationship |DA−DB|<ΔD is established. However, with this method, the head unload control is permanently performed once the head 12 (tab 144) stops on the inclined surface 164 of the ramp 16.

[Modification]

Now, a modification of the above embodiment will be described. This modification is characterized in that a failure (error) in head unload operation is determined (error determination) utilizing a change in head speed determined from the back-EMF-voltage detected by the back-EMF-voltage detector 173. In a head unload operation applied according to the present modification, the target speed Vt for the head 12 is set at the value Vt0 as in the case of the above embodiment. The head unload operation includes a step in which the head 12 (tab 144) reaches and contacts with the ramp 16 (in particular, the head 12 climbs the inclined surface 164 of the ramp 16). In this step, the head speed V temporarily decreases.

Figure 5:
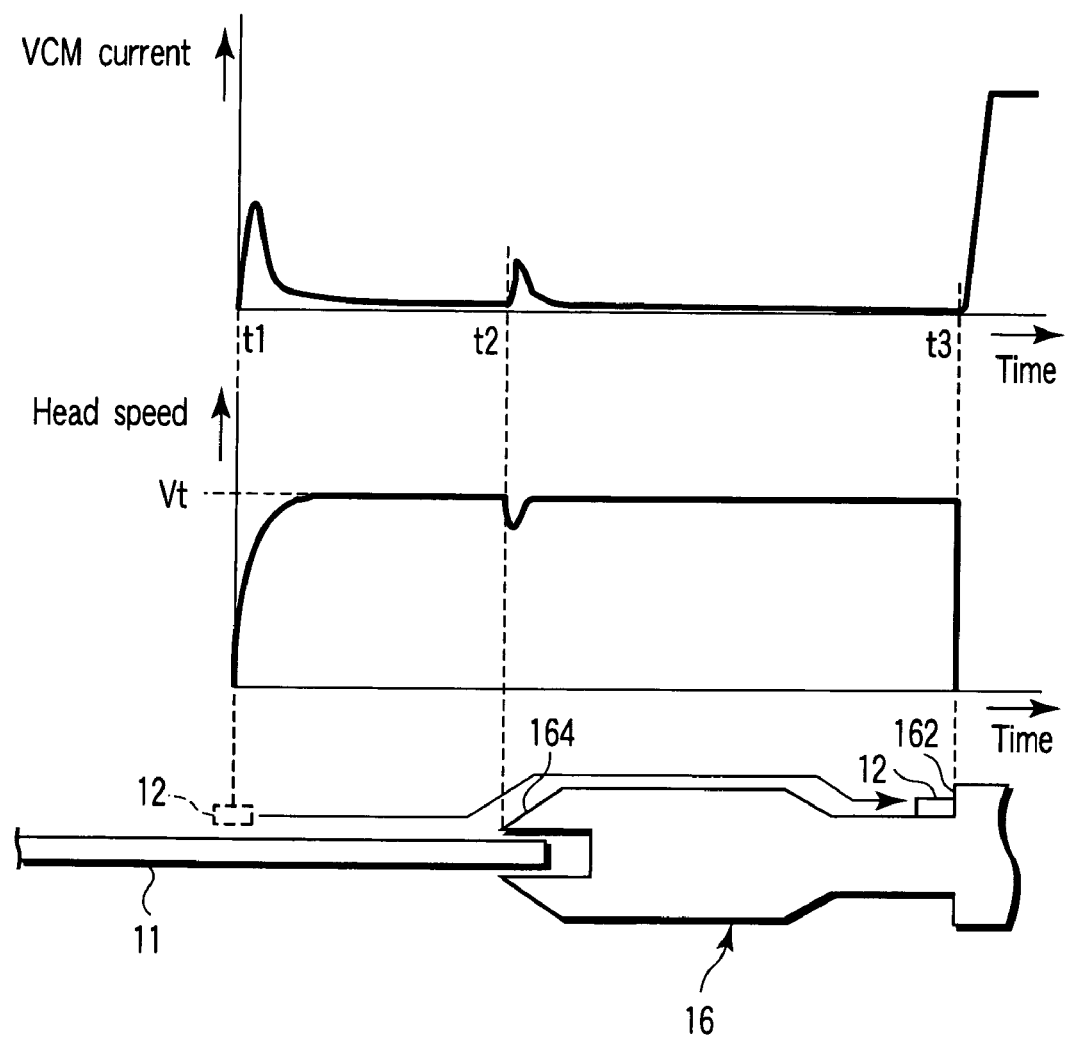
FIG. 5 is a diagram showing the relationship between a head position and both a variation in head speed and a variation in VCM current which relationship is observed if the head unload operation is determined to have succeeded according to this embodiment.

FIG. 5 shows the relationship between the head position and both a variation in the head speed and a variation in VCM current which relationship is observed if a head unload operation is correctly performed. As shown in FIG. 5, immediately after a time t1 at which the head unload operation is started, a large VCM current is generated because there is a large difference between the head speed V and the target speed Vt. Subsequently, when the head speed V becomes almost equal to the target value Vt, the VCM current decreases. Then, at a time t2, the head 12 reaches the ramp 16 and then starts to climb the inclined surface 164 of the ramp 16. The head speed V thus decreases to increase the VCM current. Subsequently, the head 12 finishes climbing the inclined surface 164 of the ramp 16. The head speed V thus returns to the target value Vt, that is, the head 12 is reaccelerated. The VCM current then decreases. Then, at a time t3, the head 12 reaches the stopper 162 of the ramp 16. The head speed V then becomes zero. At the head speed V of zero, the VCM current is maximized.

According to the modification of the embodiment, a change in head speed V is utilized to determine whether or not a head unload operation has failed. First, as in the case of the example shown in FIG. 5, if the head 12 reaccelerates after the head speed V has decreased, it is estimated to have completely climbed the inclined surface 164 of the ramp 16. It is then assumed in this situation that head unload control (speed feedback control for the head unlock control) has been performed a number of times equal to the number of sampling times C required to reliably unload the head 12 in the parking portion 161 of the ramp 16. In this case, the head 12 is expected to have reached the parking portion 161 of the ramp 16. Consequently, the head unload operation can be determined to have succeeded. In contrast, if the head 12 continuously decelerates even after the head speed V has decreased, it is estimated to remain stopped on the inclined surface 164 of the ramp 12. In this case, the head unload operation can be determined to have failed.

Figure 6:
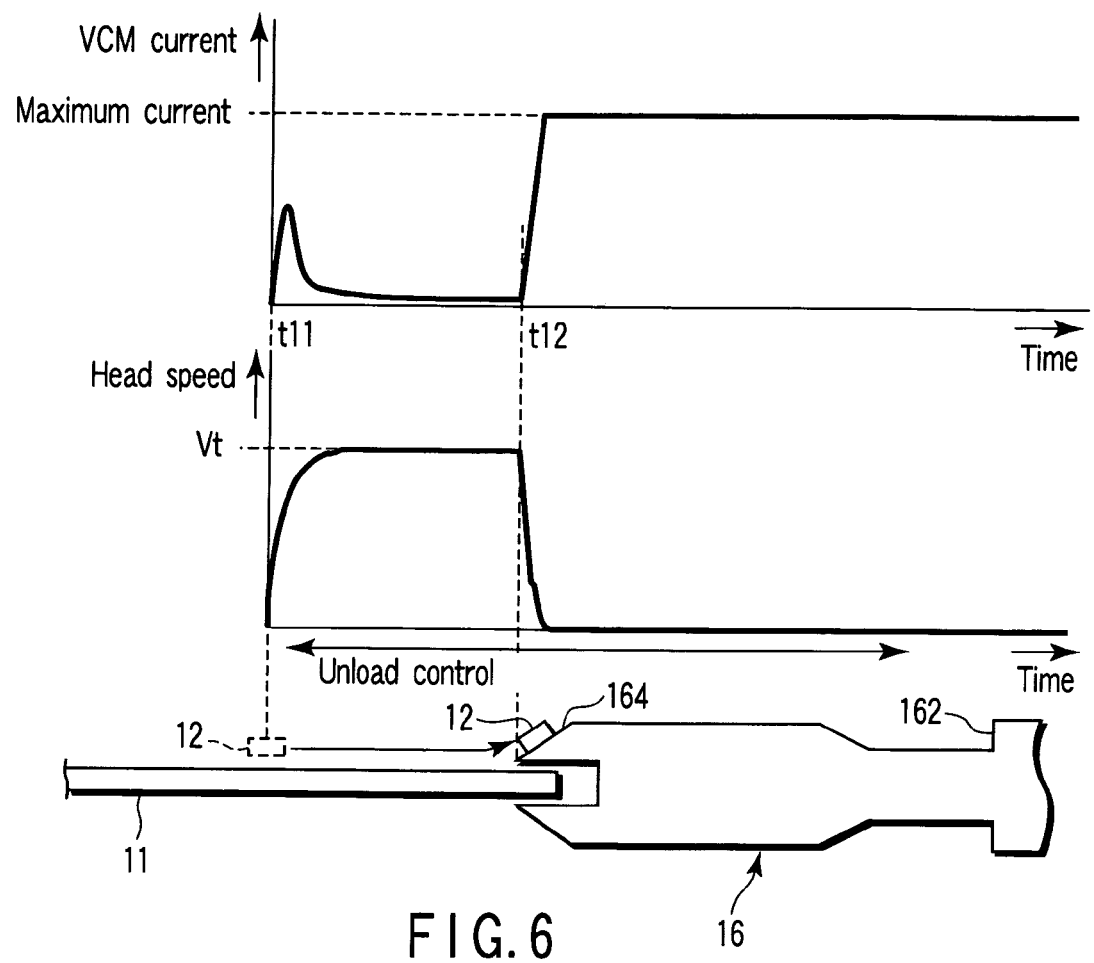
FIG. 6 is a diagram showing the relationship between the head position and both a variation in head speed and a variation in VCM current which relationship is observed if the head unload operation is determined to have failed according to this embodiment.

FIG. 6 shows the relationship between the head position and both a variation in the head and a variation in VCM current which relationship is observed if a head unload operation has failed. FIG. 6 shows that after a time t12 at which the head 12 reaches the ramp 16, it fails to completely climb the inclined surface 164 of the ramp 12 and remains stopped on the inclined surface 164. In the example shown in FIG. 6, at the time t12, the head speed V decreases to increase the VCM current. Then, when the head 12 is stopped on the inclined surface 164 of the ramp 16 to zero the head speed, the VCM current is maximized.

Figure 7:
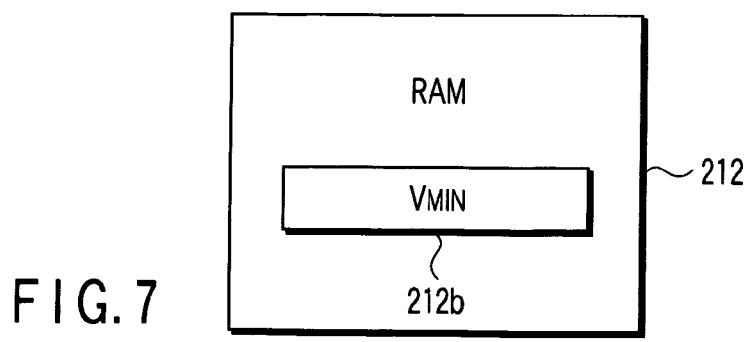
FIG. 7 is a diagram showing how a minimum head speed register 212b applied according to a modification of this embodiment is provided in a RAM 212.

In the modification of the embodiment, a minimum head speed Vmin detected during a period of head unload is utilized to determine whether or not a head unload operation has failed. Thus, a storage area of the RAM 212 is used as a minimum head speed register 212b as shown in FIG. 7. The register 212b is used to store information on the minimum head speed Vmin.

Figure 8A:
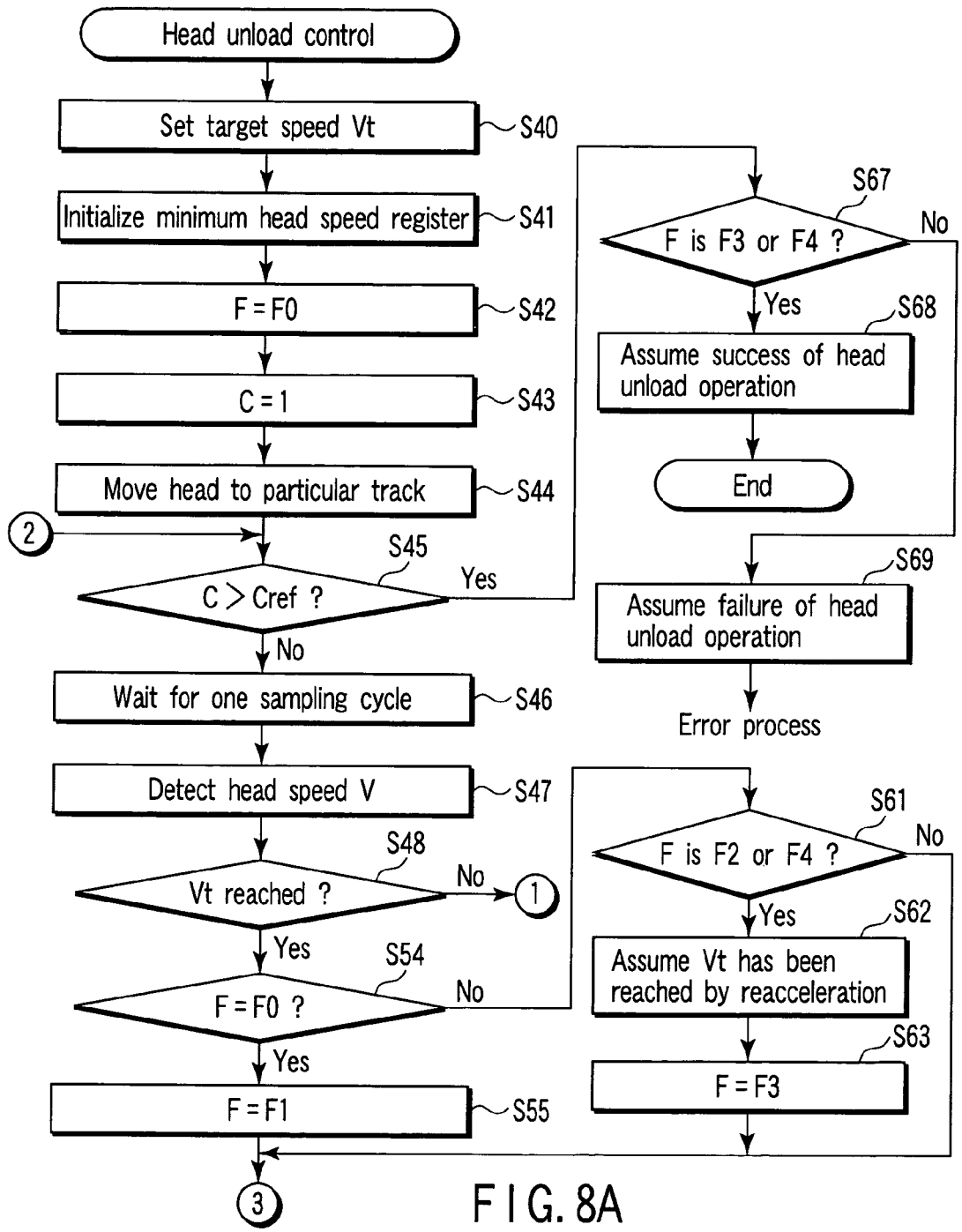
FIGS. 8A and 8B are flowcharts showing the procedure of head unload control applied according to this modification.
Figure 8B:
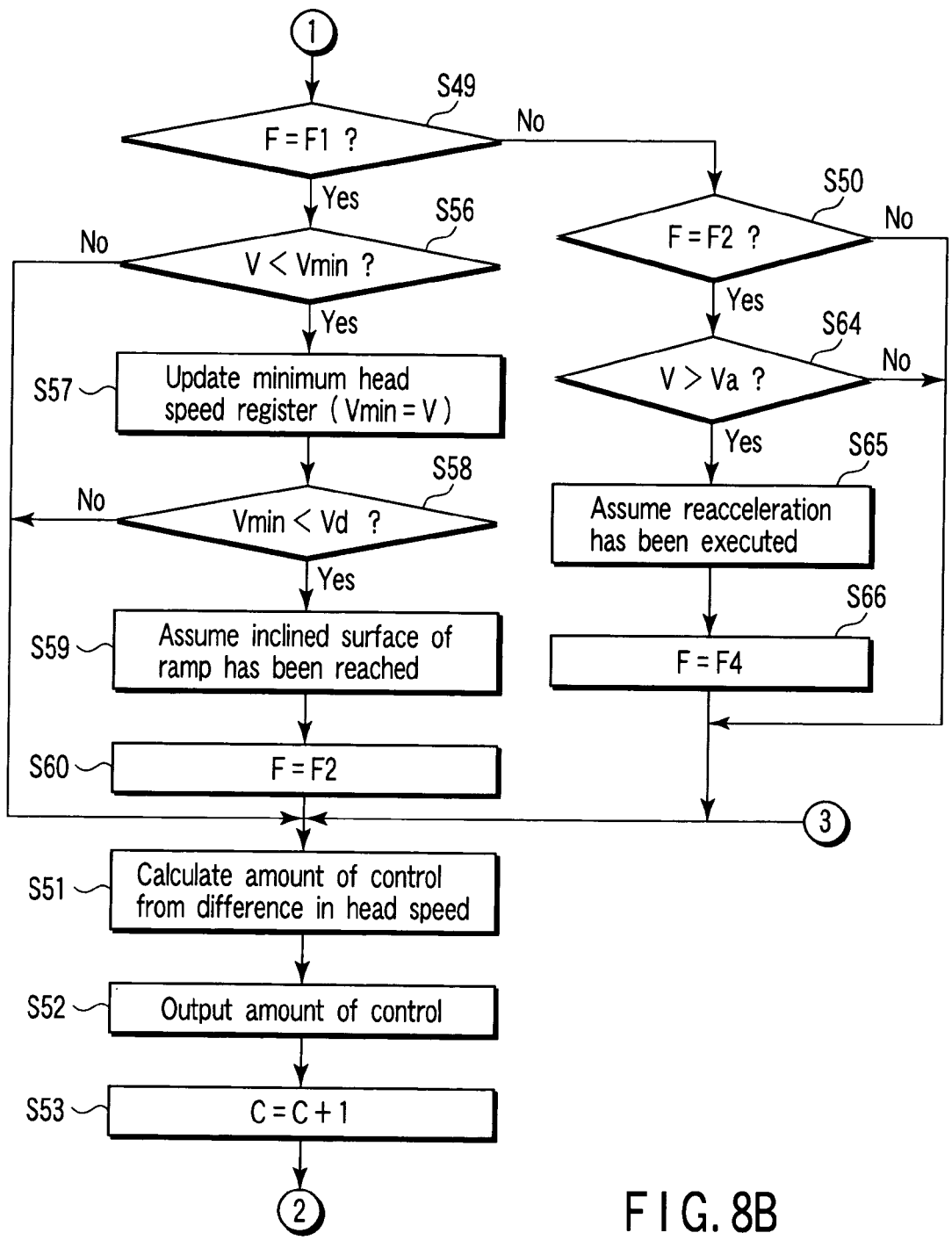

Now, with reference to the flowcharts in FIGS. 8A and 8B, description will be given of operations of the HDD according to the modification of the embodiment taking, by way of example, the head unload control that utilizes a change in head speed V to determine whether or not a head unload operation has failed. First the CPU 21 sets the target speed Vt for the head 12 (actuator 14) (step S40). Here, the target speed Vt is set at the value Vt0. The CPU 21 initializes the minimum head speed register 212b in the RAM 212 (step S41). Here, the maximum value (all bits are "1") is set for the minimum head speed register 212b.

Then, the CPU 21 sets a flag F to F0 and the counter C at an initial value of "1" (steps S42 and S43). The flag F indicates the status of the head 12 during head unload. The flag F has five types of status F0, F1, F2, F3, and F4. F0 represents the state in which the head speed V of the head 12 has not reached the target value Vt since the start of a head unload operation. F1 represents the state in which the head speed V of the head 12 has reached the target value Vt but has not reached the inclined surface 164 of the ramp 16 yet. F2 represents the state in which the head has reached the inclined surface 164 of the ramp 16 and has been decelerated but has not been reaccelerated yet. F3 represents the state in which the head 12 has been reaccelerated with its speed returning to the target value Vt. F4 represents the state in which the head has reached the inclined surface 164 of the ramp 16 and has been reaccelerated but has not returned to the target speed Vt yet.

After executing the steps S42 and S43, the CPU 21 performs seek control to move the head 12 to the particular track on the disk 11 (step S44). Then, the CPU 21 determines whether or not the value in the counter C (the number of sampling times C) exceeds the specified value Cref (step S45). If the number of sampling times C is at most the specified value Cref as in the case of this example, the CPU 21 waits for pre-specified one sampling cycle (step S46) in order to continue (perform) the head unload control. Then, the CPU 21 detects the head speed V on the basis of the back-EMF-voltage of the VCM 15 detected by the back-EMF-voltage detector 173 (step S47).

The CPU 21 determines whether or not the head speed V has reached the target value Vt (step S48). This determination is made depending on whether or not the head speed V is within the range of the target value Vt±ΔV (ΔV is a difference). If the head speed V has not reached the target value Vt, the CPU 21 determines whether the status of the flag F is F1 or F2 (step S49 or S50). In this example, the flag F is F0. If the status of the flag F is thus neither F1 nor F2, the CPU 21 calculates the amount of control provided to the VCM driver 172 on the basis of the difference between the head speed V detected and the target value Vt (step S51). The CPU 21 provides the VCM driver 172 with the amount of control calculated. The CPU 21 thus causes the VCM driver 172 to output a VCM current corresponding to the amount of control, to the VCM 15 (step S52).

After providing the VCM driver 172 with the amount of control calculated in step S51, the CPU 21 increments the counter C by one (step S53). The CPU 21 then returns to the processing in step S45. In step S45, the CPU 21 determines whether or not the value in the counter C (that is, the number of sampling times C) exceeds the specified number of times Cref. If the number of sampling times C is at most the specified value Cref, the CPU 21 detects the head speed V one sampling cycle later as in the case of the above process (steps S46 and S47).

It is assumed that the head speed V detected then reaches the target value Vt. If the head speed V has reached the target value Vt (step S48), the CPU 21 determines that the status of the flag F is F0 (step S54). If F=F0, the CPU 21 determines that the head speed V of the head 12 has just reached the target value Vt for the first time since the start of the head unload and that the head 12 has not reached the inclined surface 164 of the ramp 16. In this case, the CPU 21 changes the status of the flag F from F0 to F1 (step S55) and then proceeds to the processing in step S51.

It is assumed that the head 12 subsequently reaches the inclined surface 164 of the ramp 16. Then, the head speed V of the head 12 decreases below the target value Vt as shown in FIG. 5 or 6. In this case, the CPU 21 determines that the head speed V has not reached the target value Vt (step S48). The CPU 21 then proceeds to the processing in step S49. In step S49, the CPU 21 determines whether or not the status of the flag F is F1. If F=F1 as in the case of this example, the CPU 21 determines that the head speed V is lower than the minimum head speed Vmin indicated by the minimum head speed register 212b (step S56).

If V<Vmin, the CPU 21 updates the contents of the register 212b to a value for the current head speed V (step S57). The CPU 21 then determines whether or not the minimum head speed Vmin indicated by the updated register 212b (that is, the current head speed V) is lower than a deceleration level Vd (step S58). The deceleration level Vd is set as shown in:

$$Vd=(1-\alpha)Vt \qquad (1)$$

where α is a positive value smaller than 1 (0<α<1), for example, 0.1. That is, the deceleration level Vd is set at a value smaller than the target value Vt by a specified value.

If the speed Vmin is lower than the level Vd (step S58), the CPU 21 determines that the head 12 has reached the inclined surface 164 of the ramp 16 (step S59). In this case, the CPU 21 changes the status of the flag F from F1 to F2 (step S60). The CPU 21 then proceeds to the processing in step S51. On the other hand, if speed Vmin is at least the level Vd (step S58), the CPU 21 skips the steps S59 and S60 to proceed to the processing in step S51. The CPU 21 also proceeds to the processing in step S51 if the current head speed V is at least the minimum head speed Vmin indicated by the current register 212b (step S56).

Once the head 12 reaches the inclined surface 164 of the ramp 16, it is reaccelerated as shown in FIG. 5 if it is in a normal state. Then, the head 12 returns to the target speed Vt and is then stopped by the stopper 162 of the ramp 16. Then, according to the present modification, to determine this state to be a success in the head unload operation, the process described below is executed after the head 12 has been determined to reach the inclined surface 164 of the ramp 16 (that is, after the status of the flag F has been changed from F1 to F2).

First, if the head speed V detected in step S47 has reached the target value Vt (step S48), the CPU 21 determines whether or not the status of the flag F is F0 (step S54). In this case, the status of the flag F is F2 and not F0. Then, the CPU 21 proceeds from step S54 to processing in step S61. In step S61, the CPU 21 determines whether or not the status of the flag F is F2 or F4. If F=F2 as in the case of this example, the CPU 21 determines that the head 12 has reached the inclined surface 164 of the ramp 16 and has been decelerated and then reaccelerated to return to the target speed Vt (step S62). If F=F4, the CPU 21 also determines that the head 12 has been reaccelerated to return to the target speed Vt (step S62). Upon determining that the head 12 has been reaccelerated to return to the target speed Vt, the CPU 21 changes the status of the flag F to F3 (step S63). The CPU 21 then proceeds to the processing in step S51. In contrast, if the status of the flag F is neither F2 nor F4, the CPU 21 skips the steps S62 and S63 to proceed to step S51.

Figure 9:
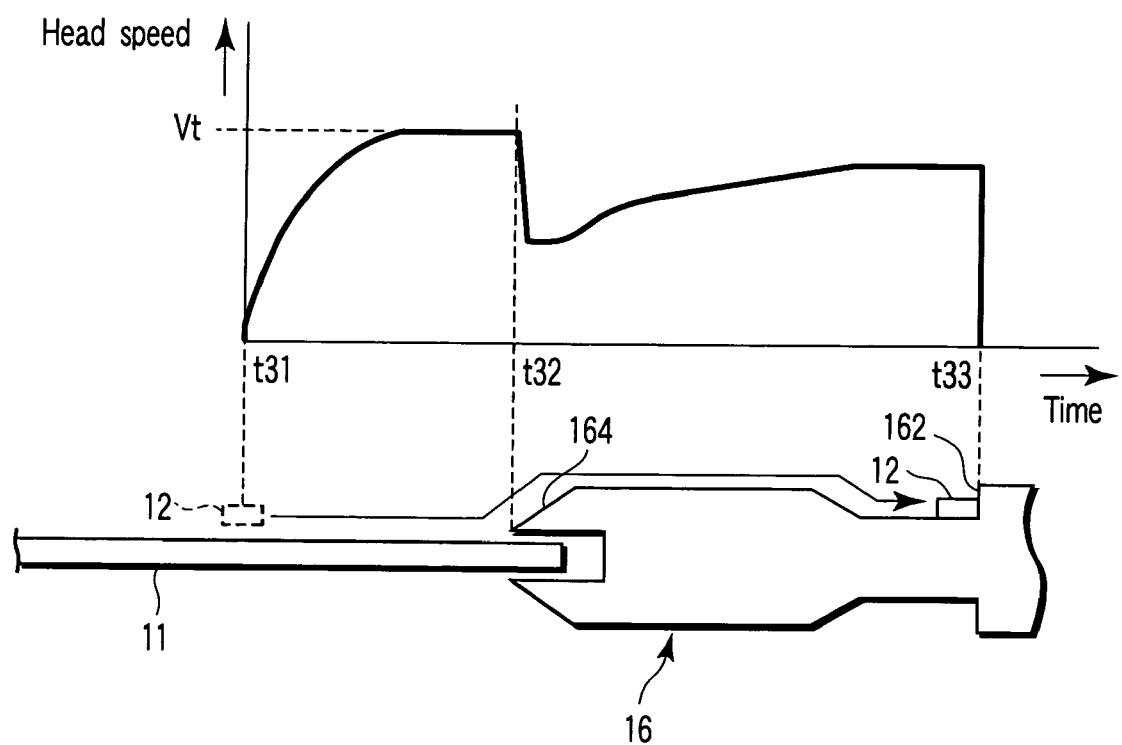
FIG. 9 is a is a diagram showing the relationship between a head position and both a variation in head speed and a variation in VCM current which relationship is observed in an unusual case in which the head unload operation is determined to have succeeded according to this modification.

On the other hand, the head 12 may become immovable after stopping on the inclined surface 164 of the ramp 16 as in the case of the example shown in FIG. 6. In this case, the CPU 21 must determine that the head unload operation has failed. Further, after reaching the inclined surface 164 of the ramp 16, the head 12 may fail to return to the target value Vt in spite of reacceleration. This example is shown in FIG. 9. A state such as the one shown in FIG. 9 may occur if a high torque is applied to the actuator 14 when the head 12 is moved from the inclined surface 164 of the ramp 16 to the parking portion 161 or if a control gain in the feedback control is low. The torque applied to the actuator 14 increases if for example, a large frictional force acts between the head 12 (tab 144) and the inclined surface 164 of the ramp 16. If the head 12 is reaccelerated, even though it fails to reach the target speed Vt, the head 12 generally reaches the stopper 162 of the ramp 16 as in the case of the example shown in FIG. 9. This must be determined to be a success in the head unload operation.

Thus, according to the present modification, after the status of the flag F has changed from F1 to F2 as a result of the determination that the head 12 has reached inclined surface 164 of the ramp 16, the process described below is executed if the head 12 fails to reach the target speed Vt. First, if the head speed V detected in step S47 has not reached the target value Vt (step S48), the CPU 21 determines whether or not the status of the flag F is F1 (step S49). In this case, the status of the flag F is F2 and not F1. Then, the CPU 21 proceeds from step S49 to processing in step S50. In step S50, the CPU 21 determines whether or not the status of the flag F is F2.

If F=F2 as in the case of this example, the CPU 21 determines that the head speed V exceeds a reacceleration level Va (step S64). The reacceleration level Va is determined at least from the target speed Vt. In this case, the reacceleration level Va is set as shown in:

$$Va = V\text{min} + \beta(Vt - V\text{min}) \quad (2)$$

where $\beta$ is a positive value smaller than 1 ($0<\beta<1$), for example, 0.8. That is, the reacceleration level Va is set at a speed higher than the head speed (minimum head speed) Vmin obtained when the head 12 is determined to reach the inclined surface 164 of the ramp 16, by a specified fraction of the difference between the target speed Vt and the minimum head speed Vmin. The reacceleration level Va may be set at a value smaller than the target value Vt by a specified value.

If the head speed V exceeds the reacceleration level Va (step S64), the CPU 21 determines that the head 12 has not returned to the target speed Vt but has been accelerated (step S65). In this case, the CPU 21 changes the status of the flag F from F2 to F4 (step S66). The CPU 21 then proceeds to the processing in step S51. In contrast, if the head speed V does not exceed the reacceleration level Va (step S64), the CPU 21 skips the steps S65 and S66 to proceed to the processing in step S51. It is then assumed that after the status of the flag F has been changed to F4 in step 66, the head speed V reaches the target value Vt. In this case, the CPU 21 proceeds to processing in step S63 via the steps S48, S54, S61, and S62 to change the status of the flag F from F4 to F3.

It is then assumed that the number of sampling times C exceeds the specified value Cref as a result of repetition of the feedback control for making the head speed V of the head 12 equal to the target value Vt. If the number of sampling times C exceeds the specified value Cref (step S45), the CPU 21 determines that the head 12 should have reached the stopper 162 of the ramp 16 as in the case of the above embodiment. In this case, the CPU 21 completes the head unload control to proceed to processing in step S67. In step S67, the CPU 21 checks the status of the flag F to determine whether or not the status of the flag F is F3 or F4. First, it is assumed that the CPU 21 determines that the status of the flag F is F3 or F4. Specifically, it is assumed that the head 12 has reached the inclined surface 164 of the ramp 16 and has been decelerated and then reaccelerated. In this case, the CPU 12 determines that the conditions for the determination that head unload is completed have been met. The CPU 12 thus determines that the head unload operation has succeeded (step S68). In contrast, it is assumed that the status of the flag G is determined to be neither F3 nor F4. In this case, the CPU 21 determines that the head unload operation has failed (step S69). Then, the CPU 21 executes an error process, for example, retries a head unload operation.

A first or second condition described below may be used to determine in step S48 whether or not the head speed V has reached the target value Vt. The first condition is that the head speed V consecutively falls within the range of the target value Vt±ΔV a pre-specified number of sampling times. The second condition is that an average head speed determined from the pre-specified number of the latest samplings falls within the range of the target value Vt±ΔV. This also applies to conditions for the determination in step S56 that the head speed V is lower than the minimum head speed Vmin indicated by the minimum head speed register 212*b*. It also applies to conditions for the determination in step S58 that the minimum head speed Vmin is lower than the deceleration level Vd. It further applies to conditions for the determination in step S64 that the head speed V exceeds the reacceleration level Va.

In the above modification, if the status of the flag F is F4 when the number of sampling times C exceeds the specified value Cref, the control gain in the next head unload control (feedback control for the head unload control) may be increased. Moreover, it is possible to combine the determination for head unload completion utilizing the head movement distance applied according to the above embodiment, with the determination for head unload completion utilizing a change in head speed on the inclined surface 164 of the ramp 16 applied according to the above modification. That is, the head unload operation can be determined to have succeeded if the conditions for the determination of head unload completion are met by all of the number of sampling times C, the head movement distance, and the status of the flag F. In this case, the determination of the head unload operation can be made further reliable compared to the above embodiment and its modification.

In the above embodiment and its modification, the present invention is applied to a hard disk drive (HDD). However, the present invention is applicable to a disk drive other than a hard disk drive, such as a magneto-optical disk drive, provided that the drive employs the head unload control for unloading the head located on the recording surface of the disk to a position located away from the recording surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive having a head which reads data written on a recording surface of a disk, the disk drive comprising:
   an actuator which supports the head such that the head is movable in a radial direction of the disk;
   a ramp located away from the recording surface of the disk and having a retract area to which the head is retracted;
   a speed detector configured to detect a movement speed of the head at predetermined sampling intervals;
   a seek control device configured to move the head to a particular radial position on the recording surface of the disk before a head unload operation of retracting the head to the retract area of the ramp;

a speed feedback control device configured to perform speed feedback control for the head unload operation based on the movement speed of the head detected by the speed detector, the speed feedback control being performed to make the movement speed of the head equal to a target value and executed a pre-specified number of times required to retract the head to the retract area of the ramp;

an estimation device configured to estimate a movement distance of the head, the estimation device calculating the estimated movement distance of the head by integrating the movement speed of the head detected by the speed detector; and a head unload operation determining device configured to determine whether the head unload operation has been correctly completed based on a predetermined reference movement distance and the movement distance of the head that is estimated by the estimation device when the speed feedback control has been executed the pre-specified number of times.

2. The disk drive according to claim 1, further comprising:
a measuring device configured to pre-measure, as the reference movement distance, the movement distance of the head required to retract the head from the particular radial direction to the retract position of the ramp; and
a nonvolatile storage device which saves the reference movement distance measured by the measuring device, and wherein the head unload operation determining device determines whether the head unload operation has been correctly completed on the basis of the movement distance estimated by the estimation device and the reference movement distance saved by the storage device.

3. The disk drive according to claim 2, wherein the measuring device includes:
a control device which causes the speed feedback control device to perform speed feedback control at a target speed higher than that of speed feedback control for a normal head unload operation; and
a reference movement distance determining device which configured to determine the movement distance estimated by the estimation means after the speed feedback control has been performed the pre-specified number of times, to be the reference movement distance.

4. The disk drive according to claim 1, further comprising:
a speed change determining device which determines a state of a change in the movement speed of the head detected by the speed detector; and
a reacceleration determining device which determines whether the head has reached the ramp and has been decelerated and then reaccelerated, on the basis of a result of the determination by the speed change determining device;
and wherein the head unload operation determining device determines whether the head unload operation has been correctly completed on the basis of the movement distance estimated by the estimation device after the speed feedback control has been performed the pre-specified number of times and the result of the determination by the reacceleration determining device.

5. The disk drive according to claim 4, wherein:
the speed change determining device determines the state of a change in the movement speed to be either a first speed change state in which after reaching the target speed, the head reaches the ramp and is decelerated and then reaccelerated to return to the target speed or a second speed change state in which after reaching the target speed, the head reaches the ramp and is decelerated and then not reaccelerated;

the reacceleration determining device determines that the head has been reaccelerated if the speed change determining device determines the first speed change state, and determines that the head has not been reaccelerated if the speed change determining device determines the second speed change state; and if the reacceleration determining device determines that the head has not been reaccelerated, the head unload operation determining device determines an error in the head unload operation.

6. The disk drive according to claim 5, wherein:
the speed change determining device includes a flag operating device which operates a flag indicating the state of a change in the movement speed, the flag having an initial status, a first flag status, a second flag status, or a third flag status, the first flag status indicating a state in which the head has reached the target speed but not reached the ramp, the second flag status indicating a state in which the head has reached and has been decelerated but has not been reaccelerated yet, and the third flag status indicating a state in which the head has been reaccelerated to return to the target speed;

if the head reaches the target speed, the flag operating device changes the flag to the first flag status when the flag has the initial status and to the third flag status when the flag has the second status, and if the head decelerates from the target speed by a predetermined level when the flag has the first flag status, the flag operating device changes the flag to the second flag status; and after the speed feedback control has been performed the pre-specified number of times, the speed change determining device determines the second speed change state if the flag has the second flag status and determines the first speed change state if the flag has the third flag status.

7. The disk drive according to claim 4, wherein:
the speed change determining device determines the state of a change in the movement speed to be either a first speed change state in which after reaching the target speed, the head reaches the ramp and is decelerated and then reaccelerated to return to the target speed or a second speed change state in which after reaching the target speed, the head reaches the ramp and is decelerated and then not reaccelerated or a third speed change state in which after reaching the target speed, the head reaches the ramp and is decelerated and then reaccelerated but does not return to the target speed;

the reacceleration determining device determines that the head has been reaccelerated if the speed change determining device determines the first or third speed change state, and determines that the head has not been reaccelerated if the speed change determining device determines the second speed change state; and if the reacceleration determining device determines that the head has not been reaccelerated, the head unload operation determining device determines an error in the head unload operation.

8. The disk drive according to claim 7, wherein:
the speed change determining device includes a flag operating device which operates a flag indicating the state of a change in the movement speed, the flag having an initial status, a first flag status, a second flag status, a third flag status, or a fourth flag status, the first flag status indicating a state in which the head has reached the target speed but not reached the ramp, the second flag status indicating a state in which the head has reached the ramp and has been decelerated but has not been reaccelerated yet, the third flag status indicating a state in which the head has been reaccelerated to return to the target speed, and the fourth flag status indicating a state in which the head has been reaccelerated but has not returned to the target speed;

if the head reaches the target speed, the flag operating device changes the flag to the first flag status when the flag has the initial status and to the third flag status when the flag has the second status, and if the head decelerates from the target speed by a predetermined level when the flag has the first flag status, the flag operating device changes the flag to the second flag status, and if the head reaccelerates when the flag has the second flag status, the flag operating device changes the flag to the fourth flag status; and after the speed feedback control has been performed the pre-specified number of times, the speed change determining device determines the second speed change state if the flag has the second flag status, determines the first speed change state if the flag has the third flag status, and determines the third speed change state if the flag has the fourth flag status.

9. A disk drive having a head which reads data written on a recording surface of a disk, the disk drive comprising:

an actuator which supports the head such that the head is movable in a radial direction of the disk;

a ramp located away from the recording surface of the disk and having a retract area to which the head is retracted;

a speed detector configured to detect a movement speed of the head at predetermined sampling intervals; a seek control device configured to move the head to a particular radial position on the recording surface of the disk before a head unload operation of retracting the head to the retract area of the ramp;

a speed feedback control device configured to perform speed feedback control for the head unload operation based on the movement speed of the head detected by the speed detector, the speed feedback control being performed to make the movement speed of the head equal to a target value and executed a pre-specified number of times required to retract the head to the retract area of the ramp;

a speed change determining device which determines a state of a change in the movement speed of the head detected by the speed detector; and a reacceleration determining device which operates after the speed feedback control has been executed the predetermined number of times, to determine whether the head has reached the ramp and has been decelerated and then reaccelerated, based on a result of the determination by the speed change determining device; and a head unload operation determining device which determines whether the head unload operation has been correctly based on a result of the determination by the reacceleration determining device.

10. A method of controlling a head unload operation, the head unload operation retracting a head located on a recording surface of a disk to a retract area of a ramp placed away from the recording surface of the disk, the method comprising:

moving the head to a particular radial position on the recording surface of the disk before the head unload operation;

detecting a movement speed of the head at predetermined sampling intervals during a period of the head unload operation in which the head moved to the particular radial position is retracted to the retract area of the ramp;

performing speed feedback control for the head unload operation at the sampling intervals on the basis of the detected movement speed of the head, the speed feedback control being performed to make the movement speed of the head equal to a target value and executed a pre-specified number of times required to retract the head to the retract area of the ramp;

estimating a movement distance of the head, the estimated movement distance of the head being calculated by integrating the speed detected at the sampling intervals; and determining whether the head unload operation has been correctly completed on the basis of the movement distance of the head, estimated when the speed feedback control has been performed the pre-specified number of times, and a reference movement distance.

11. The method according to claim 10, further comprising:

determining, at the sampling intervals, a state of a change in the movement speed of the head detected by the speed detector at the sampling intervals; and determining whether the head has reached the ramp and has been decelerated and then reaccelerated, on the basis of the state of the change in the movement speed determined after the speed feedback control has been performed the pre-specified number of times; and determining whether the head unload operation has been correctly completed on the basis of the movement distance estimated after the speed feedback control has been performed the pre-specified number of times and the result of the determination for the reacceleration.

12. A method of controlling a head unload operation, the head unload operation retracting a head located on a recording surface of a disk to a retract area of a ramp placed away from the recording surface of the disk, the method comprising:

moving the head to a particular radial position on the recording surface of the disk before the head unload operation;

detecting a movement speed of the head at predetermined sampling intervals during a period of the head unload operation in which the head moved to the particular radial position is retracted to the retract area of the ramp;

performing speed feedback control for the head unload operation at the sampling intervals on the basis of the detected movement speed of the head, the speed feedback control being performed to make the movement speed of the head equal to a target value and executed a pre-specified number of times required to retract the head to the retract area of the ramp;

determining, at the sampling intervals, a state of a change in the movement speed of the head detected by the speed detector at the sampling intervals; and determining whether the head has reached the ramp and has been decelerated and then reaccelerated, based on a result of the state of the change in the movement speed determined after the speed feedback control has been executed the predetermined number of times; and determining whether the head unload operation has been correctly completed based on a result of determination as to whether the head has reached the ramp and has been decelerated and then reaccelerated.

* * * * *